3,270,650
AUTOMATIC EXPOSURE CONTROL SYSTEM
Paul J. Ernisse, Rochester, N.Y., assignor to Eastman Kodak Company, Rochester, N.Y., a corporation of New Jersey
Filed Aug. 20, 1963, Ser. No. 303,320
6 Claims. (Cl. 95—64)

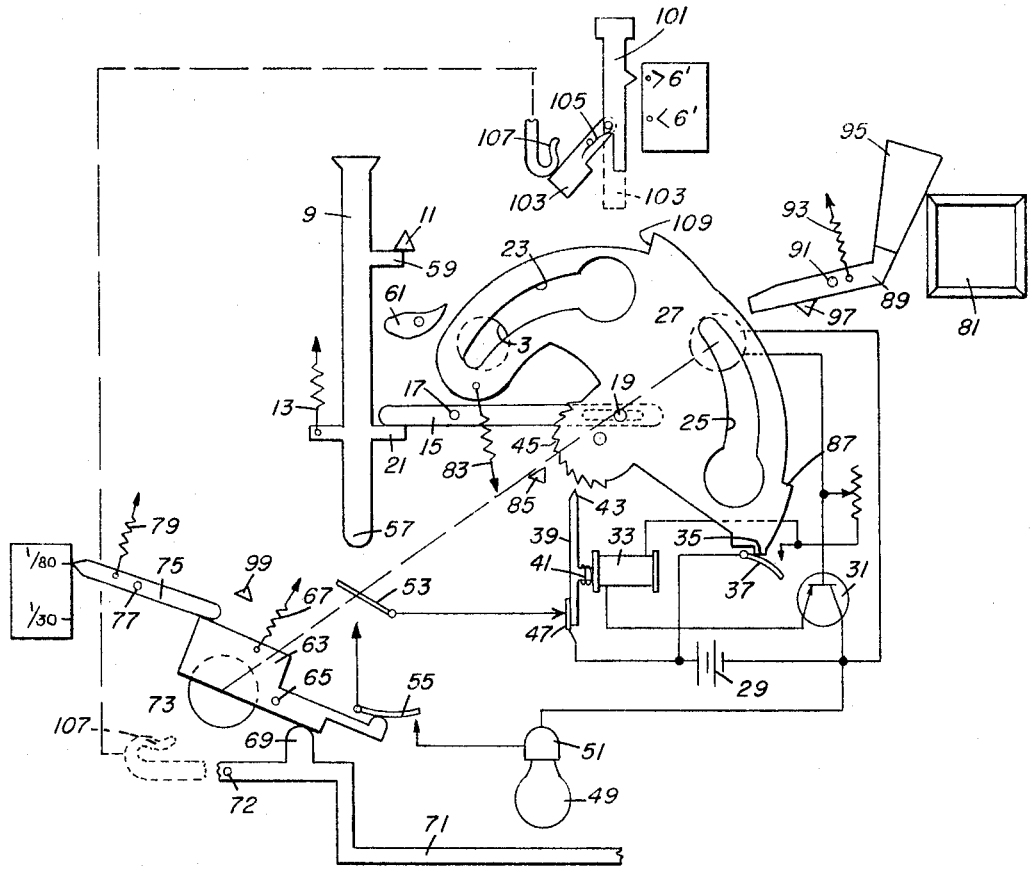

This invention relates to photographic cameras and more particularly to an electro-mechanical system for automatically controlling the exposure of film in a camera in accordance with the brightness of the scene being photographed, the system also being simply conditioned to provide automatic flash illumination when scene brightness falls below a predetermined level.

The invention uses a single diaphragm blade which is provided with two similar, elongated slits of continuously varying width. The slits mask, respectively, the camera aperture and a photo-conductive cell. When the camera is actuated by the operator, the diaphragm blade moves to gradually enlarge both the picture-taking aperture and the cell aperture. When the cell aperture has enlarged sufficiently to permit the output of the cell to reach a predetermined threshold level, an electromagnetic device is operated to stop further movement of the diaphragm blade, thereby automatically selecting the picture-taking aperture area required for proper exposure. In the event that scene brightness is inadequate to operate the electromagnetic device when the cell is at full aperture, a flag appears in the camera's viewfinder to so warn the operator.

Further, the camera according to the present invention may carry a flash bulb at all times in a covered compartment built into the camera. At the election of the operator, when lighting conditions are such as to provide inadequate or questionable illumination, the flashlamp compartment of the camera is opened. The opening of the cover of the flashlamp compartment accomplishes the following changes in camera operation: (1) adjustment of the shutter control to provide an exposure time suitable for flash purposes, (2) altering the position of a secondary mask controlling exposure of the photocell to compensate the automatic exposure control system for the adjustment of the shutter to a slower speed, (3) enabling of a blocking member to control the movement of the diaphragm blade in accordance with the position of a "distance-to-subject" indicator, and (4) closing of a switch conditioning the flash control circuit. Thereafter, the flash bulb is synchronously fired with the operation of the shutter if there is insufficient scene illumination. The automatic energization of the flash circuit is achieved by a switch responsive to the electromagnetic device referred to above. In the event that the device is operated to stop the moving diaphragm blade, indicating a sufficient level of scene illumination for proper exposure, the flash circuit is opened to prevent ignition of the flash bulb in response to the operation of the camera shutter.

It is an object of this invention to provide a novel, simple and economical mechanism for automatically controlling exposure of film in a photographic camera.

It is another object to provide an automatic exposure control system in which a single moving diaphragm blade is formed with a pair of slits controlling, respectively, the size of the camera's picture-taking aperture and the exposure of the photo-responsive element.

It is a further object to provide a novel system in which the camera's automatic exposure control mechanism may be completely conditioned for automatic flash control in an extremely simple manner, namely, merely by opening the flashlamp compartment of the camera.

Other objects, purposes and characteristic features of the present invention will appear from the following description, reference being made to the accompanying drawing, in which a camera according to the invention herein is schematically represented, the drawing of the camera including only those camera parts essential for an understanding of the invention, all other camera parts being omitted.

The camera illustrated in the drawing has a picture-taking aperture 3 with which are conventionally aligned the camera's shutter and lens system (not shown). A diaphragm blade 5 mounted for movement about axis 7 is normally held in the position illustrated by camera actuating member 9, the latter being normally biased against stop 11 by spring 13. The connection between actuating member 9 and diaphragm blade 5 is provided by blade return lever 15 which moves about pivot 17 and is connected to diaphragm blade 5 by means of pin 19, the opposite end of lever 15 abutting shoulder 21 of camera actuating member 9.

Diaphragm blade 5 has two slits 23 and 25 of continuously variable area, the slits being positioned, respectively, in masking relation to aperture 3 and photoconductive cell 27. The movement of diaphragm blade 5 in a counterclockwise direction about its axis 7 results in continuously-increasing exposure of both aperture 3 and cell 27 to scene illumination.

Cell 27 is connected to battery 29 in circuit with transistor amplifier 31 and solenoid 33. When the camera mechanism is in its normal rest position as illustrated, a projection 35 on diaphragm blade 5 holds spring contact 37 in an open position, thereby normally maintaining the just-described photo-responsive circuit in an open condition. Whenever solenoid 33 is energized, it attracts armature 39 against the influence of spring 41, causing pawl end 43 of armature 39 to engage ratchet teeth 45 formed on the periphery of diaphragm blade 5, and at the same time, opening armature contact 47 of the flash circuit which will now be described.

Flash bulb 49 is received in socket 51 of the camera's flashlamp compartment and is energized by battery 29 through a circuit including armature contact 47 and spring contacts 53 and 55. When camera actuating member 9 is depressed by the camera operator, flash operating nub 57 of actuating member 9 closes spring contact 53 at some time just prior to the actuation of the camera shutter which occurs when an abutment 59 of actuating member 9 contacts shutter operating lever 61.

Spring contact 55 is normally held open by one end of flash control lever 63 which is mounted for movement about pivot 65. Flash control lever 63 is maintained in the position illustrated against the force of spring 67 by projection 69 of flashlamp compartment cover 71 when cover 71 is in closed relation to the compartment. When in this position, the opposite end of flash control lever 63 is positioned in partial masking relation to photocell aperture 73. When in the position illustrated, the masking end of flash control lever 63 also serves as a stop for shutter speed control lever 75 which moves about pivot 77, being biased to the position shown by spring 79.

*Normal daylight operation*

When the operator desires to take a picture with the camera disclosed herein, he directs the camera at the subject to be photographed and frames it in viewfinder 81. For normal daylight operation, flashlamp compartment cover 71 is closed as illustrated and described above, thereby positioning flash control lever 63 so that one of its ends opens the flash lamp circuit at spring contact 55, while the other end partially masks photocell 27 and permits shutter speed control lever 75 to be positioned by spring 79 to adjust the camera's shutter mechanism for the faster of its two assumed shutter speeds.

Diaphragm blade 5, in its normal rest position, is adjusted so that slits 23 and 25 provide minimum exposure of both aperture 3 and photocell 27. When the operator is ready to take the picture, he depresses camera actuating member 9 in a downward direction against the bias of spring 13 causing shoulder 21 to move away from the abutting end of blade return lever 15. This releases diaphragm blade 5 for counterclockwise direction until such time as the current passed by photoconductive cell 27 and amplified by transistor 31 sufficiently energizes solenoid 33 to cause the attraction of its armature 39.

It should be noted that, as diaphragm blade 5 moves in a counterclockwise direction an ever-increasing area of exposure is provided by slit 25 for photoconductive cell 27, thereby causing a continuous increase in the current passed by cell 27. When a predetermined threshold current (as amplified by transistor 31), is achieved, the attraction of armature 39 by solenoid 33 causes pawl end 43 of armature 39 to engage one of the ratchet teeth 45 of diaphragm blade 5, thereby stopping diaphragm blade 5 in the position which it has attained at that time. The movement of diaphragm blade 5 relative to aperture 3 alters the size of the effective picture-taking aperture of the camera as defined by variable slit 23 and aperture 3. In this manner, when the threshold current is reached and movement of diaphragm blade 5 is arrested by armature 39, the camera has been automatically provided with an effective picture-taking aperture which will assure correct exposure of the film.

As camera actuating member 9 nears the bottom of its stroke, flash operating nub 57 closes spring contact 53 (but this does not effectively energize flash bulb 49 due to the fact that the circuit is open at spring contact 55 at this time), and then abutment 59 of actuating member 9 strikes shutter operating lever 61, resulting in an exposure of the film in the camera.

When the operator releases actuating member 9, it is moved in an upward direction under the influence of spring 13 and its shoulder 21 causes the clockwise rotation of blade return lever 15 which, acting through pin 19, rotates diaphragm blade 5 in a clockwise direction back to its normal rest position as shown. The return of diaphragm blade 5 to its rest position once again causes projection 35 of blade 5 to open spring contact 37, thereby opening the camera's photo-responsive circuit.

In the event that there is insufficient illumination to provide a proper exposure of the film in the camera, armature 39 is not attracted by solenoid 33 and diaphragm blade 5 continues to rotate in a counterclockwise direction under the influence of spring 83 until such time as it comes to rest against stop 85. However, just prior to the time it comes to rest, a peripheral projection 87 on diaphragm blade 5 contacts signal lever 89 and moves signal lever 89 in a clockwise direction about pivot 91 against the force of spring 93. This causes translucent "low-light" flag 95 to appear in viewfinder 81 and thereby warns the operator that more light is required for a correct exposure under existing conditions of scene illumination. When the camera is restored to its normal "at rest" position by the release of actuating member 9, signal lever 89 is returned to its position as illustrated, being moved in a counterclockwise direction under the influence of spring 93 until it abuts stop 97.

*Automatic flash operation*

When the operator believes scene illumination to be either inadequate or at least questionable, the camera may be conditioned to provide automatic flash illumination by the single, simple act of opening flashlamp compartment cover 71 by moving it in a clockwise direction about axis 72. This moves projection 69 of cover 71 away from flash control lever 63 which is then permitted to move in a clockwise direction under the influence of spring 67 until arrested by stop 99. This movement of flash control lever 63 allows spring contact 55 to close, unmasks photocell 27, and moves shutter speed control lever 75 against the bias of spring 79 to adjust the shutter speed of the camera to a slower ("flash") speed.

In the event that there is insufficient illumination for proper exposure when the camera is conditioned for optional automatic flash operation as just described above, the depression of actuating member 9 results in the counterclockwise movement of diaphragm blade 5 to the position limited by stop 85. In this position a maximum picture-taking aperture is provided, and, as actuating member 9 reaches the bottom of its stroke, nub 57 closes spring contact 53 causing the ignition of flash bulb 49. The ignition of flash bulb 49 is followed shortly by the operation of the camera shutter as explained above. It should be noted that the relative time of operation of flash bulb and shutter is presented herein purely a schematic manner, such shutter-flash synchronization not being a part of the invention herein.

Provision is also made to prevent over-exposure due to intense flash illumination where the subject is quite close to the camera. A "distance-to-subject" indicator slide 101 which is set manually by the operator, is shown as a simple mechanism that may be slid up or down to indicate whether the photographic subject is more or less than six feet from the camera. A diaphragm blade blocking member 103 is movably pinned to one end of indicator slide 101 and is biased by spring 105 against resilient abutment 107 of flash lamp compartment cover 71. Whenever cover 71 is opened by clockwise movement about its axis 72, resilient abutment 107 drives blocking member 103 against the force of spring 105 until member 103 is locked against slide 101 in the position shown in dotted lines.

If the camera is conditioned for flashlamp operation in the manner just described, and indicator slide 101 is positioned for a distance-to-subject of less than six feet, blocking member 103 will engage projection 109 of diaphragm blade 5, intercepting the normal movement of diaphragm blade 5 (as explained above) and causing slit 23 to provide a picture-taking aperture of small enough area to prevent over-exposure of the film due to the intensity of the close-up flash illumination. If, however, indicator slide 101 is set for distances greater than six feet, blocking member 103 will be raised sufficiently to allow projection 109 to pass unimpeded, permitting diaphragm blade 5 to move toward its maximum aperture position.

In the event that the questional scene illumination is actually sufficient to result in proper film exposure under the increased exposure latitude provided by the slower shutter speed to which the camera is adjusted when flash cover 71 is opened, solenoid 33 will receive sufficient energization to actuate its armature 39 to stop diaphragm blade 5 in a position providing an appropriate picture-taking aperture. Since the actuation of armature 39 opens contact 47 prior to the time that spring contact 53 is closed by nub 57, ignition of flash bulb 49 is thereby prevented. In this manner, the invention herein provides automatic flash control in conjunction with its basic automatic exposure control system.

A specific embodiment of the present invention has been described with particularity to facilitate disclosure of the invention rather than to limit the number of forms which it may assume, and the specific form shown may be modified and adapted to meet practical requirements without departing from the spirit or scope of the invention. For instance, slit 25 may be replaced by a filter of varying neutral density or by step wedges as a means for varying the exposure of phototcell 27. Such modification might be required where the photo-sensitive device being used has nonlinear response characteristics.

What is claimed is:

1. In a camera having a film-exposing aperture, a manually operable camera actuating device, and light-sensitive means including a photo-responsive cell for producing an output varying in accordance with scene brightness, the improvement comprising: a diaphragm blade means normally maintained in a first position and released for movement in one direction only toward a second position by the operation of said actuating device, said blade means having therein a pair of elongated slits of continuously varying width, said slits being positioned, respectively, in covering relation to said aperture and said photo-responsive cell to form proportionally varying exposure masks for said aperture and said cell at all times during the movement of said blade means; and threshold means responsive to said output and movable to a position engaging said blade means for stopping the movement of said blade means intermediate said first and second positions, the movement of said blade means toward said second position varying the exposure of said photocell until such time as the output of the photocell reaches a predetermined value.

2. The combination according to claim 1 wherein said actuating device includes a spring, a member normally biased by said spring to a rest postiton and manually movable against said spring bias to a camera actuating postiton, and means connecting said member and said diaphragm blade means, said diaphragm blade means being released for movement from said first position toward said second position when said member is manually moved toward said actuating position, and said blade mean being moved to said first position whenever said member is removed to said normal rest position.

3. The combination according to claim 1 wherein said camera also includes
   (A) a shutter mechanism in capping relation to said aperture and adjustably moveable out of said capping relation to provide either one of a faster and a slower film exposure time,
   (B) a flashlamp,
   (C) a flashlamp energizing circuit,
   (D) a flashlamp cover movable into and out of covering relation to said flashlamp,
   (E) a secondary masking member movable into and out of partital masking relation to said cell, and
   (F) manually operable means for indicating distance to the subject being photographed, said means including a blocking element movable into and out of a position for engaging said diaphragm blade means, the movement of said blade means being blocked by said element only when said element is in said engaging position and said indicating means is operated to indicate a predetermined distance-to-subject value, and
   (G) flash control means interconnecting said cover, circuit, shutter mechanism, masking member, and indicating means, said control means being responsive to the position of said cover
      (1) when said cover is in covering relation to said flashlamp
         (a) to open said circuit,
         (b) to adjust said shutter to provide said faster exposure time,
         (c) to move said masking member into partial masking relation to said cell, and
         (d) to move said blocking element to said disengaged position, and
      (2) when said cover is moved out of covering relation to said flashlamp
         (a) to adjust said shutter to provide said slower exposure time,
         (b) to move said masking member out of masking relation to said cell,
         (c) to move said blocking element to said engaged position, and
         (d) to close said circuit energizing said flashlamp when said shutter is moved out of said capping relation and said photocell output fails to reach said predetermined threshold value.

4. The combination according to claim 1 wherein said diaphragm blade means includes an engaging surface, wherein said cell is of the photo-conductive type, and wherein said light-sensitive means and said threshold means comprise a circuit including (a) said cell, (b) a source of electro-motive force, (c) an electro-magnetic device having a member normally maintained in a rest position and movable into contact with the engaging surface of the diaphragm blade means for arresting further movement of the blade means whenever said device receives a predetermined level of energization, and (d) an electronic amplifier for amplifying the output of said cell to energize said electro-magnetic device, the level of said energization changing in accordance with the intensity of scene brightness and with a variation in exposure of said cell during movement of the diaphragm blade means.

5. The combination according to claim 4 wherein said circuit further includes electrical contact means in series connection with said source, said contact means being movable between closed and open positions, and means responsive to the movement of said diaphragm blade means for moving said contact means
   (i) to said open position when said diaphragm blade means is in said first position, and
   (ii) to said closed position when said blade means is
      (a) in said second position, and
      (b) intermediate said first and second positions.

6. The combination according to claim 1 wherein said camera also includes a viewfinder and viewfinder signal means movable into alignment with said viewfinder, said signal means being responsive to said diaphragm blade means for movement into alignment with said viewfinder whenever said diaphragm blade means reaches said second position.

References Cited by the Examiner

UNITED STATES PATENTS

| | | | |
|---|---|---|---|
| 2,841,064 | 7/1958 | Bogby et al. | 95—64 |
| 3,111,071 | 11/1963 | Bogby | 95—64 |
| 3,116,673 | 1/1964 | Bogopolsky | 95—64 |

NORTON ANSHER, *Primary Examiner.*

C. B. PRICE, *Assistant Examiner.*